United States Patent [19]

Wagner et al.

[11] 4,011,263

[45] Mar. 8, 1977

[54] PROCESS FOR THE PRODUCTION OF N-ACETYL-L-METHIONINE

[75] Inventors: Hans Wagner, Constance; Alfred Maierhofer, Allensbach, both of Germany

[73] Assignee: Deutsche Gold- und Silber-Scheideanstalt vormals Roessler, Frankfurt, Germany

[22] Filed: May 11, 1976

[21] Appl. No.: 685,420

[30] Foreign Application Priority Data

July 4, 1975 Germany .......................... 2529854

[52] U.S. Cl. ............................................ 260/534 S
[51] Int. Cl.² ...................................... C07C 101/04
[58] Field of Search ................................ 260/534 S

[56] References Cited

UNITED STATES PATENTS

| 2,700,037 | 1/1955 | Schmid et al. ................. 260/534 S |
| 2,745,873 | 5/1956 | Callanan et al. ............... 260/534 S |

FOREIGN PATENTS OR APPLICATIONS

| 1,493,600 | 5/1969 | Germany ....................... 260/534 S |
| 43-18893 | 1968 | Japan ............................. 260/534 S |

*Primary Examiner*—Joseph E. Evans
*Attorney, Agent, or Firm*—Cushman, Darby & Cushman

[57] ABSTRACT

N-acetyl-L-methionine is prepared by reacting L-methionine with acetic anhydride in the presence of aqueous alkali at a temperature between 20° and 60° C. at a pH between 6.5 and 10. Preferably, there are used 1.05 to 1.70 moles of acetic anhydride per mole of L-methionine.

10 Claims, No Drawings

PROCESS FOR THE PRODUCTION OF N-ACETYL-L-METHIONINE

The invention concerns a process for the production of N-acetyl-L-methionine by reacting L-methionine with acetic anhydride in the presence of aqueous alkali. N-acetyl-L-methionine is useful as a nutritional additive.

It is known to produce N-acetyl-L-methionine by the acetylation of L-methionine in concentrated acetic acid using an equimolar amount of acetic anhydride (Greenstein - Winitz, *Chemistry of the Amino Acids*, John Wiley and Sons, New York and London (1962), Vol. III, page 2149). In this process, by experience, we have found that there is only obtained a yield of 70%. There results an N-acetyl-L-methionine which, to be sure, optically, is almost pure, but generally contains 4-(β-methylmercaptoethyl) oxazolone-5 as an impurity.

Besides, it is known to produce N-acetyl-L-methionine by reacting L-methionine at about 0° C. with more than twofold the molar amount of acetic anhydride in the presence of aqueous alkali in a strongly-alkaline medium (J. Biol. Chem., Vol. 98 (1932), page 300, et seq.). We have found by experience that, by this process, the yield, at best, is 60%. An especial disadvantage is that the product is partially racemized.

Ther has now been found a process for the production of N-acetyl-L-methionine from L-methionine by means of acetic anhydride which is characterized by the reaction being carried out at temperatures between about 20° and 60° C. at a pH between about 6.5 and 10.0. According to this process, optically-pure N-acetyl-L-methionine is recovered with yields of at least 90%.

According to the invention, the acetylation is undertaken suitably at temperatures of about 20° to 60° C., preferably at temperatures of 30° to 50° C. Thereby, the pH is maintained between 6.5 and 10.0, preferably between 7.0 and 9.5.

It is advantageous to use the acetic anhydride in at least equimolar amounts based on the L-methionine. Preferably, there are used 1.05 to 1.70 moles, especially 1.10 to 1.30 moles, of acetic anhydride per mole of methionine.

In order to establish and maintain the necessary pH of about 6.5 to 10.0, according to the invention, there is added alkali to the reaction mixture. It is advantageous to use as the alkali an aqueous solution of alkali hydroxide, e.g., sodium hydroxide or potassium hydroxide, preferably sodium hydroxide. The amount of alkali is dependent to a certain extent upon the amount of acetic anhydride and the type of alkali. In the case of the use of alkali hydroxide, there is generally added about 1.6 to 2.1 moles of alkali hydroxide per mole of acetic anhydride. Advantageously, there is present in the reaction mixture about 15 to 30 moles of water per mole of L-methionine. However, the amount of water can vary from 5 to 200 moles per mole of L-methionine.

To carry out the process of the invention, preferably L-methionine is present in water and then the acetic anhydride is gradually added. The mixture is always held to a pH of about 6.5 to 10.0 before and during the feeding of the acetic anhydride by addition of alkali.

The N-acetyl-L-methionine is advantageously recovered from the reaction mixture by acidifying the reaction mixture, for example, with sulfuric acid, and then extracting with a solvent such as ethyl acetate and separating the N-acetyl-L-methionine from the solvent. If necessary, the N-acetyl-L-methionine is recrystallized and, for this purpose, it is suitable to use water as the solvent.

In the following examples, the rotary power of the N-acetyl-L-methionine is always given as the specific rotation $[\alpha]_D^{20}$ in degrees × cm³/dm × g.

Unless otherwise indicated, all parts and percentages are by weight.

EXAMPLE 1

149 grams (1.00 mole) of L-methionine were present in 390 ml. of water. In the course of 45 minutes, there were simultaneously added 119 ml. of a 50% solution of sodium hydroxide (2.27 moles of sodium hydroxide) and 114 ml. (1.21 moles) of acetic anhydride. The procedure was such that the pH of the mixture was always kept between 7.0 and 8.0. The temperature of the mixture meanwhile, and for a further 30 minutes, was held at 40° C. Then 70 ml. of concentrated sulfuric acid (1.26 moles of sulfuric acid) were added so that the pH fell to 1.8. Thereby, there resulted two phases. The lighter phase which consisted of N-acetyl-L-methionine was separated off. The heavier, aqueous phase was sucessively extracted with 300 ml., 200 ml. and 100 ml. of ethyl acetate. The extracts were mixed with the N-acetyl-L-methionine phase. This mixture was washed with 50 ml. of water, then concentrated under reduced pressure to 300 ml., treated with 2.5 grams of activated carbon, heated for a short time to 80° C., and subsequently filtered over a pressure filter. Upon cooling the filtrate to 5° C., the N-acetyl-L-methionine crystallized out. It was filtered off under suction, washed with 30 ml. of ice cold water, and then dried at 50° C. under reduced pressure. After concentration of the mother liquor to half its volume in a corresponding manner, there was recovered a further portion of N-acetyl-L-methionine, In all, there were obtained 132 grams of N-acetyl-L-methionine, corresponding to a yield of 90% based of the L-methionine added. The product was 99.9% pure, had a melting point of 104° to 105° C. and, in water at a concentration of 4 grams per 100 ml. of water, had a specific rotation of −21.0°.

EXAMPLE 2

The procedure was the same as in Example 1. However, there were present 112 grams (0.75 mole) of L-methionine in 300 ml. of water. In the course of 45 minutes, there were simultaneously added 93 ml. of a 50% aqueous solution of sodium hydroxide (1.77 moles of sodium hydroxide) and 86 ml. (0.91 mole) of acetic anhydride. The process was carried out in such a manner that the pH of the mixture was always between 9.0 and 10.0. The temperature of the mixture during the addition and for a further 30 minutes was held at 35° C. The procedure otherwise was as in Example 1. There were recovered a total of 129 grams of N-acetyl-L-methionine, corresponding to a yield of 92% based on the L-methionine added. The product had a purity of 99.8%, a melting point of 103° to 105° C., and, in water, at a concentration of 4 grams per 100 ml. of water, had a specific rotation of −20.9°.

The process can comprise, consist essentially of, or consist of the steps set forth with the materials set forth.

What is claimed is:

1. A process for the production of N-acetyl-L-methionine comprising reacting L-methionine with acetic anhydride in the presence of aqueous alkali at a temperature between about 20° and 60° C., while maintaining the pH between about 6.5 and 10.0.

2. The process of claim 1 wherein there are employed 1.05 to 1.70 moles of acetic anhydride per mole of L-methionine.

3. The process of claim 2 wherein the pH is maintained during the reaction by addition of alkali hydroxide.

4. The process of claim 3 wherein the alkali hydroxide is sodium hydroxide.

5. The process of claim 3 wherein there is employed 5 to 200 moles of water per mole of L-methionine.

6. The process of claim 5 wherein there are employed 1.6 to 2.1 moles of alkali hydroxide per mole of acetic anhydride.

7. The process of claim 6 wherein the pH is 7 to 10.

8. The process of claim 7 wherein the pH is 7 to 9.5 and there are used 1.10 to 1.30 moles of acetic anhydride per mole of L-methionine.

9. The process of claim 5 wherein the pH is 7 to 9.5.

10. The process of claim 9 wherein there are used 1.10 to 1.30 moles of acetic anhydride per mole of L-methionine.

* * * * *